(12) United States Patent
Mallaley et al.

(10) Patent No.: US 10,315,862 B2
(45) Date of Patent: Jun. 11, 2019

(54) PARTICLE FEEDER

(71) Applicant: Cold Jet, LLC, Loveland, OH (US)

(72) Inventors: Daniel Mallaley, Cincinnati, OH (US); Richard Joseph Broecker, Milford, OH (US); Robert Mitchell Kocol, Cincinnati, OH (US)

(73) Assignee: Cold Jet, LLC, Loveland, OH (US)

(*) Notice: Subject to any disclaimer, the term of this patent is extended or adjusted under 35 U.S.C. 154(b) by 0 days.

(21) Appl. No.: 15/062,842

(22) Filed: Mar. 7, 2016

(65) Prior Publication Data

US 2016/0257506 A1  Sep. 8, 2016

Related U.S. Application Data

(60) Provisional application No. 62/129,483, filed on Mar. 6, 2015.

(51) Int. Cl.
| | |
|---|---|
| *B65G 53/46* | (2006.01) |
| *B65G 53/16* | (2006.01) |
| *F16J 15/16* | (2006.01) |
| *B24C 1/00* | (2006.01) |
| *B24C 7/00* | (2006.01) |

(52) U.S. Cl.
CPC ............. *B65G 53/16* (2013.01); *B24C 1/003* (2013.01); *B24C 7/0046* (2013.01); *B24C 7/0092* (2013.01); *B65G 53/4641* (2013.01); *F16J 15/164* (2013.01)

(58) Field of Classification Search
CPC .................................................. B65G 53/4641
USPC ........................................... 406/64, 67, 128
See application file for complete search history.

(56) References Cited

U.S. PATENT DOCUMENTS

| | | | | |
|---|---|---|---|---|
| 1,875,677 A | * | 9/1932 | Thaler ................ | B65G 53/4633 406/67 |
| 3,151,784 A | * | 10/1964 | Tailor ................. | B65G 53/4633 222/368 |
| 3,161,442 A | * | 12/1964 | Reed ................... | B65G 53/4616 406/135 |
| 3,516,714 A | * | 6/1970 | Brown ................. | D21B 1/063 406/67 |
| 3,522,972 A | * | 8/1970 | Kemp ................... | B65G 53/00 406/67 |
| 3,610,476 A | * | 10/1971 | Starrett .............. | B65G 53/4641 222/636 |
| 3,625,487 A | * | 12/1971 | Spragg ................. | B01F 5/0471 366/11 |

(Continued)

FOREIGN PATENT DOCUMENTS

WO    WO 2002/060647 A1    8/2002

OTHER PUBLICATIONS

International Search Report and Written Opinion for PCT Application No. PCT/US2016/021189, dated May 11, 2016.

(Continued)

*Primary Examiner* — Joseph A Dillon, Jr.
(74) *Attorney, Agent, or Firm* — Frost Brown Todd LLC

(57) ABSTRACT

An apparatus is described which introduces cryogenic particles received from a source of particles, having a first pressure, into a moving transport fluid, having a second pressure, for ultimate delivery to a workpiece or target as particles entrained in a transport fluid flow which seals between the source of particles and the transport fluid flow.

18 Claims, 8 Drawing Sheets

(56) References Cited

U.S. PATENT DOCUMENTS

| | | | |
|---|---|---|---|
| 3,806,199 A * | 4/1974 | Aonuma | B65G 53/4633 |
| | | | 406/63 |
| 3,955,486 A * | 5/1976 | Strommer | A23P 30/32 |
| | | | 99/323.4 |
| 4,154,486 A * | 5/1979 | Nishikawa | B65G 53/32 |
| | | | 406/48 |
| 4,536,121 A * | 8/1985 | Stewart | B65G 53/4641 |
| | | | 222/270 |
| 4,744,181 A | 5/1988 | Moore et al. | |
| 4,843,770 A | 7/1989 | Crane et al. | |
| 4,947,592 A * | 8/1990 | Lloyd | B24C 7/0092 |
| | | | 134/7 |
| 5,018,667 A | 5/1991 | Lloyd | |
| 5,050,805 A | 9/1991 | Lloyd et al. | |
| 5,071,289 A | 12/1991 | Spivak | |
| 5,109,636 A | 5/1992 | Lloyd et al. | |
| 5,188,151 A | 2/1993 | Young et al. | |
| 5,249,426 A | 10/1993 | Spivak et al. | |
| 5,288,028 A | 2/1994 | Spivak et al. | |
| 5,301,509 A | 4/1994 | Lloyd et al. | |
| 5,405,062 A | 4/1995 | Torchard | |
| 5,473,903 A | 12/1995 | Lloyd et al. | |
| 5,520,572 A | 5/1996 | Opel et al. | |
| 5,615,830 A * | 4/1997 | Matsunaga | B05B 5/1683 |
| | | | 222/368 |
| 5,645,379 A * | 7/1997 | Stoner | B65G 53/4616 |
| | | | 222/240 |
| 5,678,971 A * | 10/1997 | Hiorth | B65G 53/4633 |
| | | | 222/368 |
| 6,024,304 A | 2/2000 | Sawada | |
| 6,042,458 A | 3/2000 | Lehnig et al. | |
| 6,346,035 B1 | 2/2002 | Anderson et al. | |
| 6,695,679 B2 | 2/2004 | Anderson et al. | |
| 6,726,549 B2 | 4/2004 | Rivir et al. | |
| 6,739,529 B2 | 5/2004 | Linger et al. | |
| 6,824,450 B2 | 11/2004 | Opel | |
| 7,094,004 B2 * | 8/2006 | Dunlop | B60P 1/00 |
| | | | 406/145 |
| 7,112,120 B2 | 9/2006 | Rivir et al. | |
| 7,125,204 B2 * | 10/2006 | Wysong | B60P 1/60 |
| | | | 239/661 |
| 7,303,362 B2 * | 12/2007 | Dunlop | B60P 1/00 |
| | | | 222/608 |
| 8,187,057 B2 | 5/2012 | Broecker | |
| 8,353,644 B2 * | 1/2013 | Dunlop | B60P 1/00 |
| | | | 406/144 |
| 8,869,551 B2 | 10/2014 | Young et al. | |
| 9,700,989 B1 * | 7/2017 | Cooper | B24C 1/00 |
| 2003/0199232 A1 * | 10/2003 | Rivir | B24C 1/003 |
| | | | 451/38 |
| 2007/0128988 A1 * | 6/2007 | Rivir | B24C 1/003 |
| | | | 451/38 |
| 2012/0291479 A1 | 11/2012 | Moore et al. | |
| 2014/0110510 A1 | 4/2014 | Rivir et al. | |
| 2017/0036869 A1 * | 2/2017 | Baier | B65G 53/4641 |

OTHER PUBLICATIONS

International Preliminary Report on Patentability for PCT Application No. PCT/US2016/021189, dated Sep. 12, 2017.
U.S. Appl. No. 61/487,837, filed May 19, 2011.
U.S. Appl. No. 61/589,551, filed Jan. 23, 2012.
U.S. Appl. No. 61/592,313, filed Jan. 30, 2012.
U.S. Appl. No. 62/129,483, filed Mar. 6, 2015.

* cited by examiner

PARTICLE FEEDER

The present invention claims priority from and incorporates by reference in its entirety U.S. Provisional Patent Application, Ser. No. 62/129,483, filed on Mar. 6, 2015, titled Particle Feeder.

TECHNICAL FIELD

The present disclosure relates generally to the continuous or nearly continuous transfer of particles from a first area across a pressure differential to a second area having a pressure different than the first area, and is particularly directed to an apparatus and method for sealing between the two areas during the transfer of particles. Specifically disclosed is an apparatus which introduces cryogenic particles received from a source of particles, having a first pressure, into a moving transport fluid, having a second pressure, for ultimate delivery to a workpiece or target as particles entrained in a transport fluid flow which seals between the source of particles and the transport fluid flow.

BACKGROUND

Carbon dioxide systems, including apparatuses for creating solid carbon dioxide particles, for entraining particles in a transport gas and for directing entrained particles toward objects are well known, as are the various component parts associated therewith, such as nozzles, are shown in U.S. Pat. Nos. 4,744,181, 4,843,770, 5,018,667, 5,050,805, 5,071,289, 5,188,151, 5,249,426, 5,288,028, 5,301,509, 5,473,903, 5,520,572, 6,024,304, 6,042,458, 6,346,035, 6,695,679, 6,726,549, 6,739,529, 6,824,450, 7,112,120, 8,187,057 and 8,869,551, all of which are incorporated herein in their entirety by reference. Additionally, U.S. Patent Provisional Application Ser. No. 61/487,837 filed May 19, 2011 and U.S. Non-Provisional patent application Ser. No. 13/475,454 filed May 18, 2012 both For Method And Apparatus For Forming Carbon Dioxide Particles, U.S. Patent Provisional Application Ser. No. 61/589,551 filed Jan. 23, 2012, for Method And Apparatus For Sizing Carbon Dioxide Particles, and U.S. Patent Provisional Application Ser. No. 61/592,313 filed Jan. 30, 2012, for Method And Apparatus For Dispensing Carbon Dioxide Particles, U.S. Ser. No. 14/062,118 filed Oct. 24, 2013 for Apparatus Including At Least An Impeller Or Diverter And For Dispensing Carbon Dioxide Particles And Method Of Use, all are hereby incorporated in their entirety by reference. Although this patent refers specifically to carbon dioxide in explaining the invention, the invention is not limited to carbon dioxide but rather may be applied to any suitable cryogenic material. Thus, references to carbon dioxide herein are not to be limited to carbon dioxide but are to be read to include any suitable cryogenic material.

Many prior art blasting system include rotating members, such as rotors, with cavities or pockets for transporting particles into the transport gas flow. Seals are used, urged against the rotor surface to maintain the pressure differential, with the goal of minimizing parasitic loses due to the contact while obtaining adequate sealing.

BRIEF DESCRIPTION OF THE DRAWINGS

The accompanying drawings illustrate embodiments, and, together with the specification, including the detailed description which follows, serve to explain the principles of the present innovation.

DETAILED DESCRIPTION

Figure 1:
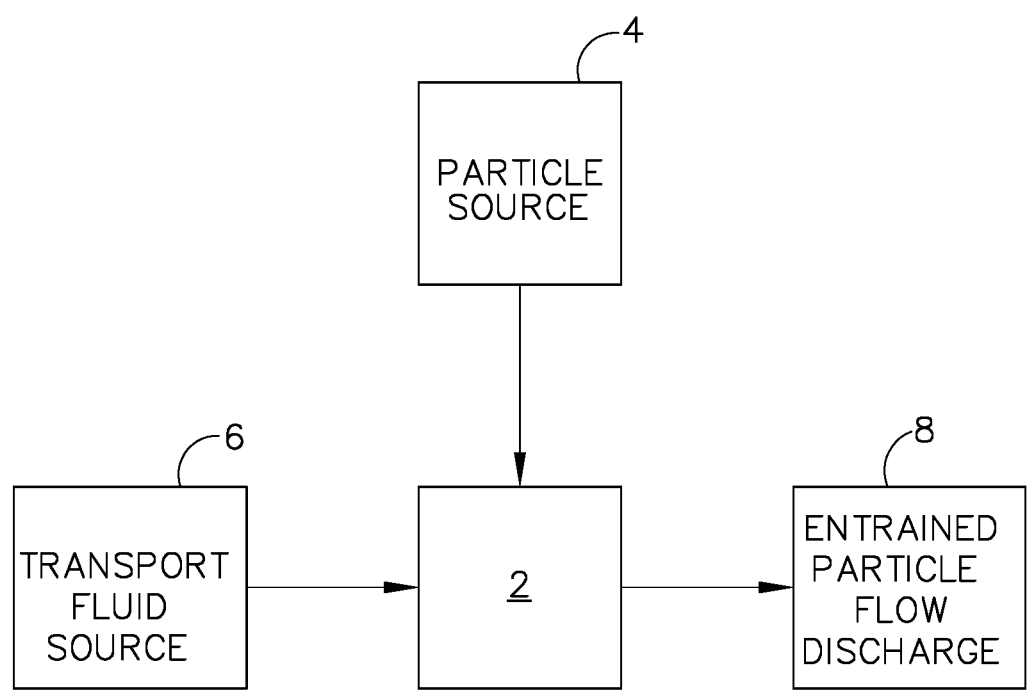
FIG. 1 diagrammatically illustrates an apparatus configured in accordance with the teachings of this disclosure to entrain the particles in transport fluid flow and seal between different pressures.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, an embodiment constructed according to the teachings of the present invention is described.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

FIG. 1 diagrammatically illustrates apparatus 2 which receives particles from particle source 4, receives moving transport fluid from transport fluid source 6, entrains the particles in the moving transport fluid and discharges the entrained particle fluid flow 8, which flows to an ultimate use, such as being directed against a workpiece or other target. Particle source 4 may be any suitable source, such as a holding or storage device, for example a hopper, or a continuous distribution device, for example a device in which particles flow upon creation directly and continuously with substantially no storage of the particles to apparatus 2. Transport fluid from transport fluid source 6 may be any suitable transport fluid, such as air, at any suitable pressure, such as 40 psig up to 300 psig. Typically, the pressure of the environment surrounding the particles at the location at which they are received by apparatus 2 from source 4 is different than the pressure of the transport fluid at and/or within apparatus 2. For example, the pressure of the particles in source 4 and at the location at which they are received by apparatus 2 may be the ambient atmospheric pressure, whereas the pressure of the transport fluid may be 40 psig and higher. Within the teachings of this disclosure, apparatus 2 is configured to entrain the particles in the transport fluid flow and seal between the different pressures to prevent or minimize leakage from the higher pressure area to the lower pressure area.

Figure 2:
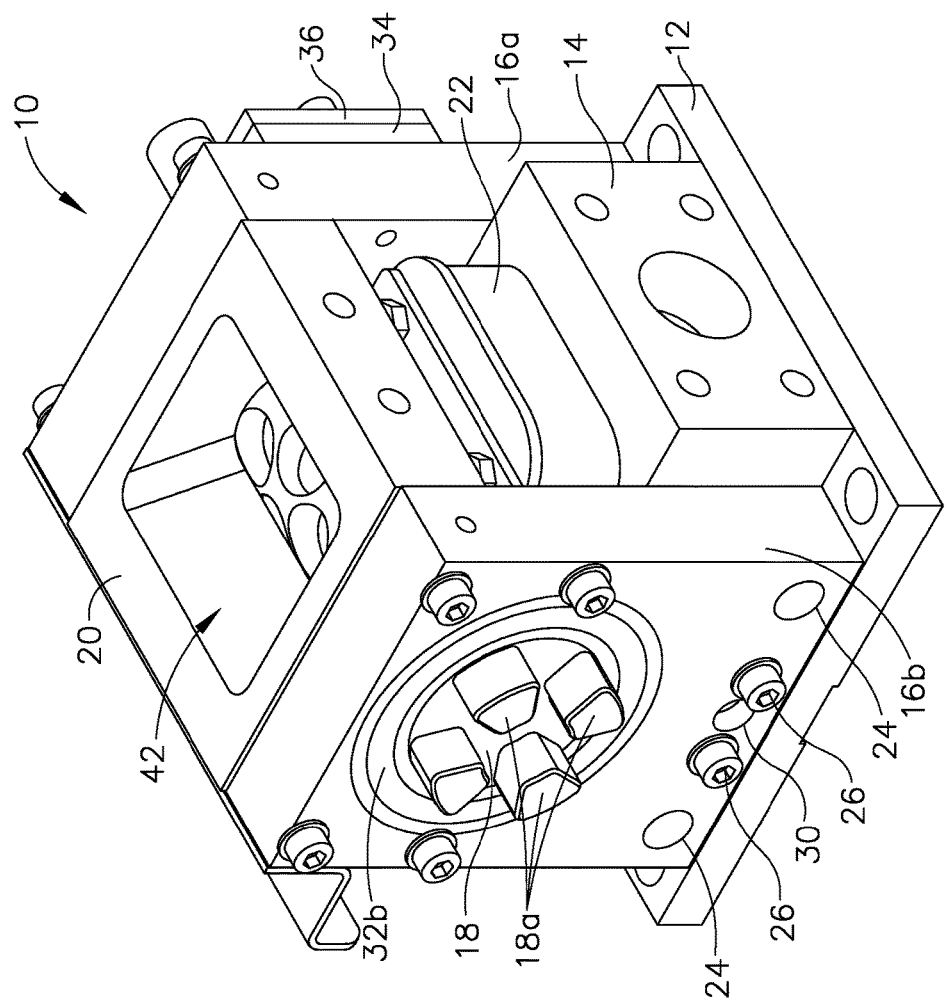
FIG. 2 is an isometric view of an embodiment of apparatus 2 depicted as a particle feeder.
Figure 3:
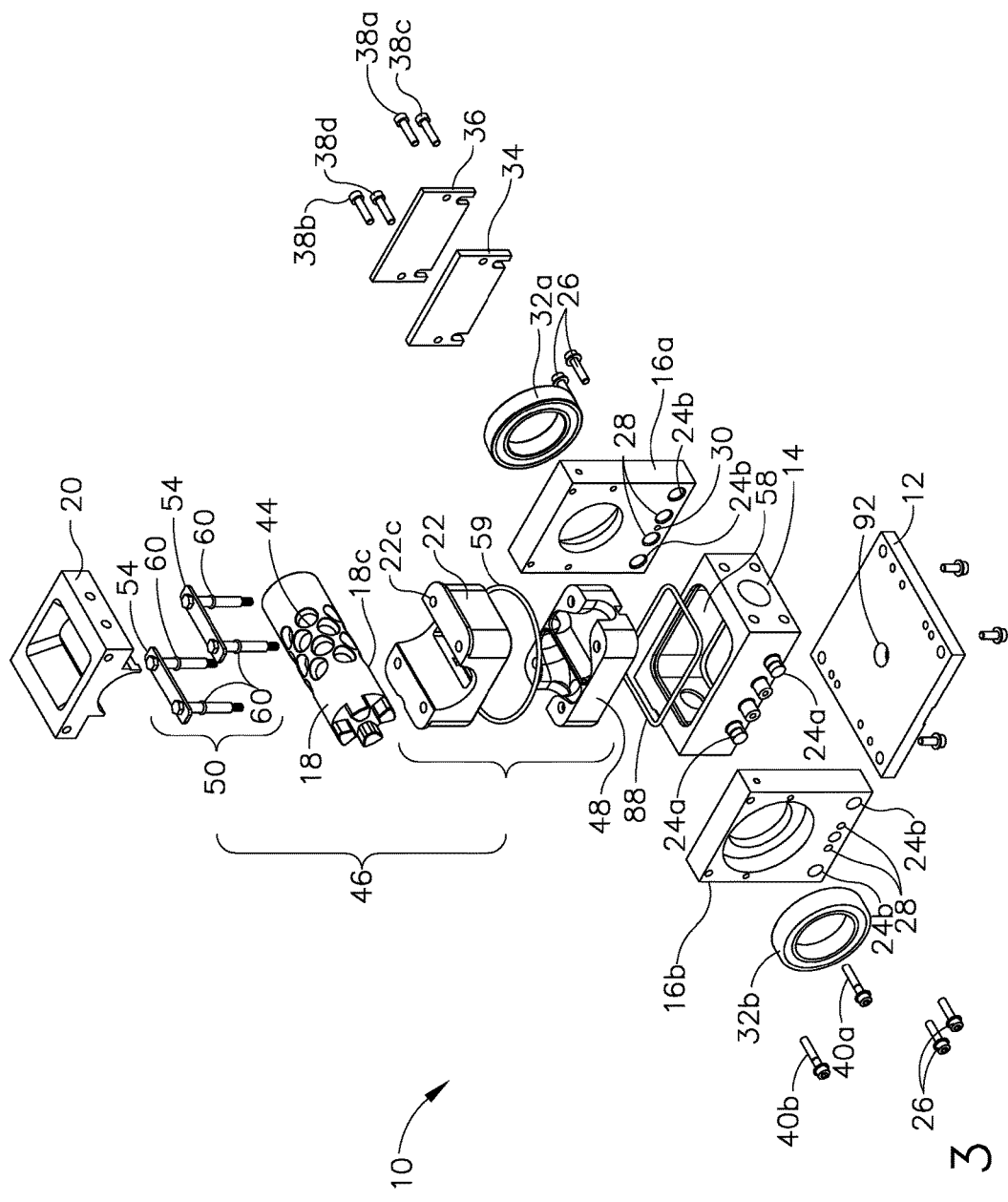
FIG. 3 is an exploded view of the feeder of FIG. 2.

FIGS. 2 and 3 illustrate feeder assembly 10, which is a representative embodiment of apparatus 2. Feeder assembly 10 comprises base 12, feeder block 14, bearing supports 16a, 16b, rotor 18, upper seal 20, and lower seal 22. Feeder block 14 may also be referred to as housing 14. Lower seal 22 may be part of lower seal/piston assembly as described below. Bearing supports 16a, 16b may be mounted directly to feeder block 14, aligned relative thereto by aligning features which may comprise locating pins 24a extending from feeder block 14 into locating bores 24b. Bearing supports 16a and 16b may be secured to feeder block 14 in any suitable manner, such as through the use of fasteners 26 extending through bores 28 (see FIG. 3) and threadingly engaging feeder block 14. Bearing supports 16a, 16b may include disassembly feature 30, which, in the embodiment depicted, is a threaded hole into which a threaded member may be inserted and rotated to push against feeder block 14 thereby separating bearing supports 16a, 16b from feeder block 16.

Each bearing support 16a, 16b supports a respective bearing 32a, 32b, which may be a sealed bearing. Bearings 32a, 32b locate and rotatably support rotor 18 for rotation. Rotor 18 includes interface 18a for engaging a source of rotational power in a manner as is well known. Thrust bearing plate 34 and retaining plate 36 retain rotor 18 at its other end. Thrust bearing plate 34 may be made of any suitable material, such as UHMW plastic. Fasteners 38a, 38b, 38c, 38d removably secure thrust bearing plate 34 and retaining plate 36 to bearing support 16a, allowing withdrawal of rotor 18 through bearing 32a.

Upper seal 20 and lower seal 22 may be made of any suitable material such as, by way of example only, an unreinforced, semi-crystalline thermoplastic polyester based on polyethylene terephthalate (PET-P), such as is sold under the trade name Ertalyte®. Upper seal 20 may be supported by bearing supports 16a, 16b via fasteners 38a, 38b, 40a, 40b, in sealing engagement with the upper portion 18b of peripheral surface 18c (see FIG. 4) upper surface of rotor 18. Upper seal 20 includes opening 42 which is configured to receive particles from particle source 4, which as noted above, may be any suitable source, such as a hopper or a device which meters particles from a storage area, such as shaving or passing particles through openings, directly to opening 42 with substantially no storage of the particles.

Figure 4:
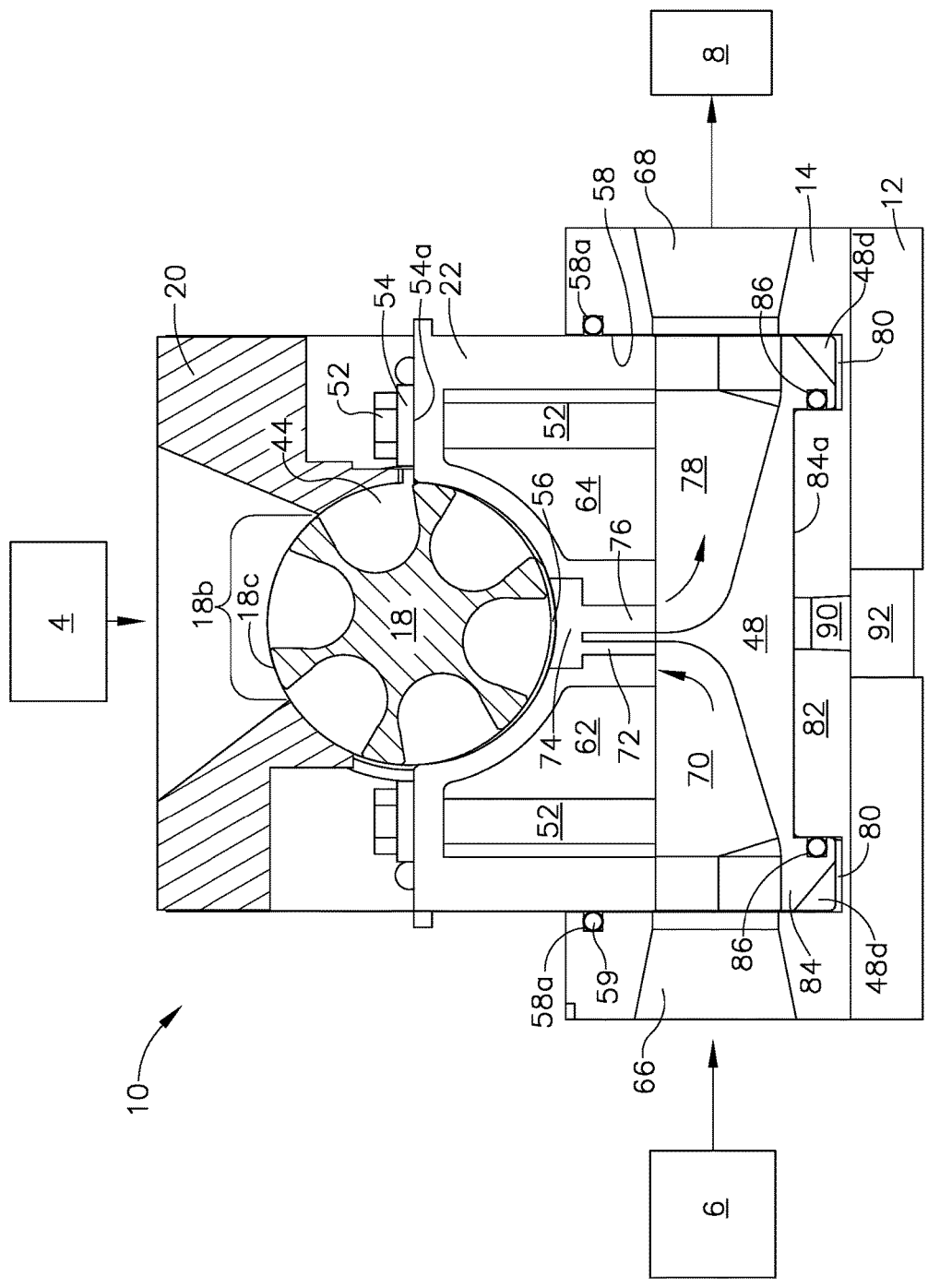
FIG. 4 is a side cross-sectional view of the feeder of FIG. 2.
Figure 5:
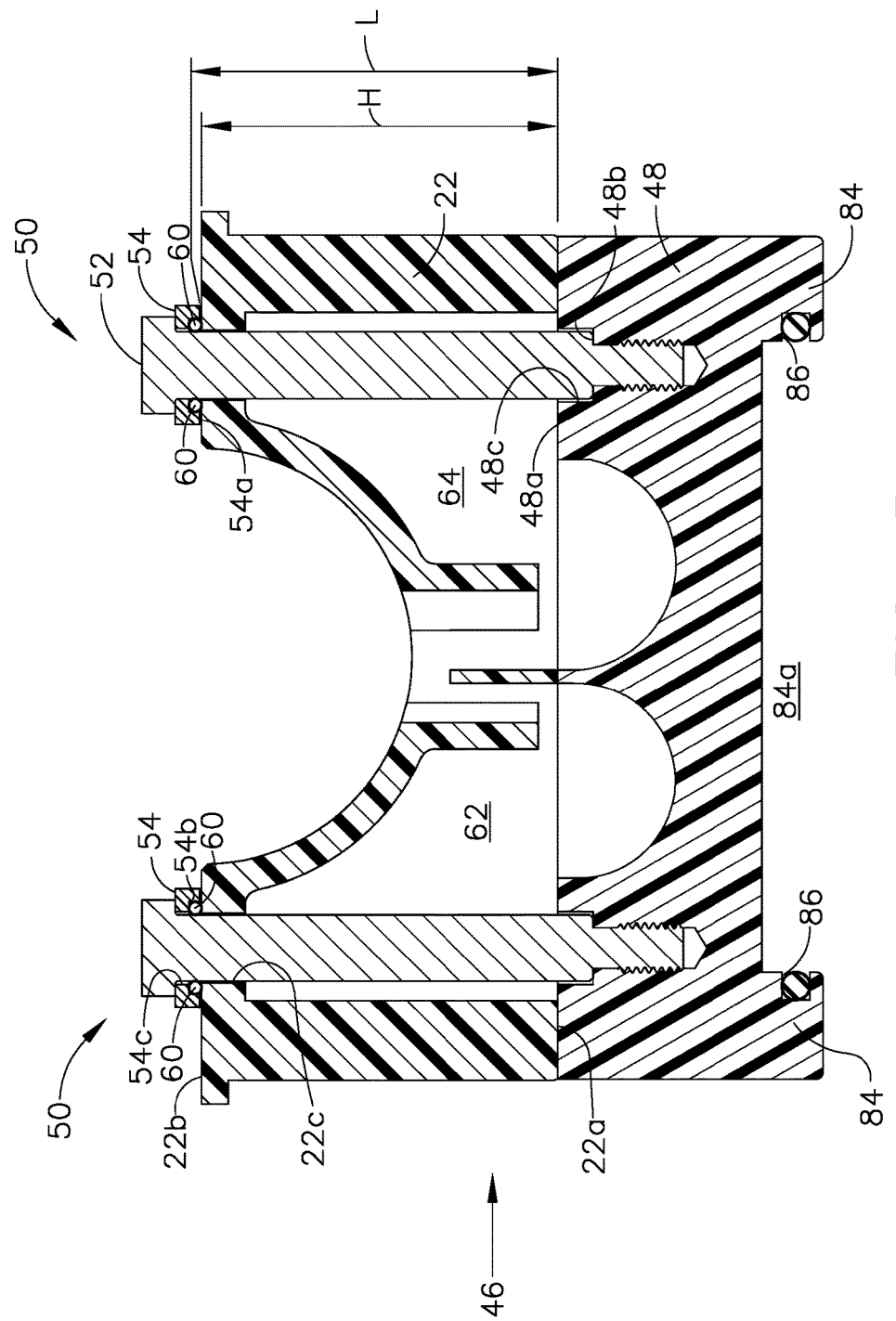
FIG. 5 is an enlarged fragmentary cross-sectional side view of the fastener retaining the lower seal pad to the piston of the feeder of FIG. 2.

Referring also to FIG. 4 (which is a cross-section taken through the midplane of feeder assembly 10, except that the cross-section of rotor 18 is taken through a midplane of one circumferential row of pockets 44), upper seal 20 provides suitable sealing with upper portion 18b without creating significant drag on rotor 18. As seen also in FIG. 5, in the embodiment depicted, lower seal 22 is part of lower seal/piston assembly 46, which comprises lower seal 22, piston 48, and retaining system 50. Retaining system 50 comprises fasteners 52 and load distributing straps 54. With reference also to FIG. 5, retaining system 50 secures lower seal 22 to piston 48 but allows relative movement therebetween. Fasteners 52 may be configured as illustrated as shoulder bolts which extend through openings 22c in upper surface 22b to engage piston 48 to establish a dimension L between upper surface 48a of piston 48 and lower surface 54a which is greater than dimension H, the height of lower seal 22 from lower surface 22a to upper surface 22b. Fasteners 52 are illustrated as shoulder bolts which are tightened against respective steps 48b of bores 48c thereby establishing the distance between upper surface 48a and the lower surface of the head of fastener 52, which bears against load distributing straps 54. The clearance (difference) between dimensions L and H in conjunction with the clearances between openings 22c and fasteners 52 and with the clearance between lower seal 22 and cavity 58 of feeder block 14, which is a relatively loose fit, allows lower seal to move and tilt in all directions, this relative movement also referred to herein as float. The amount of float allows lower seal 22 to align itself to rotor 18. This float, inter alia, reduces the precision required to achieve the alignment needed between lower seal 22 and rotor 18 to provide the desired amount of sealing between lower seal 22 and peripheral surface 18c. For example, FIG. 4 illustrates gap 56 between peripheral surface 18c and lower seal 22. When the flow of transport fluid is started through the internal passageway (as described below), the fluid pressure will move lower seal 22 relative to piston 48 to urge upper surface 22b into alignment with peripheral surface 18c as lower seal 22 is urged into sealing engagement with peripheral surface 18c of rotor 18 as described herein. Additionally, as described below, piston 48 may be configured to urge lower seal 22 into sealing engagement with rotor 18.

Straps 54 include respective grooves 54b disposed in lower surface 54a surrounding respective openings 22c through which respective fasteners 52 are disposed. Respective seals 60, illustrated as O-rings which may be made of any suitable material such as Buna-N, are disposed in respective grooves 54b to seal openings 22c against pressure leaking out of inlet side chamber 62 and outlet side chamber 64. Seals 60 may be configured to provide such sealing throughout the entire range of float of lower seal 22. Seal 59 is disposed in groove 58a sealing between lower seal 22 and cavity 58.

Adequate, but not excessive, sealing pressure between rotor 18 and lower seal 22 is necessary to prevent incoming transport fluid from leaking from feeder assembly 10. The prior art described in U.S. Pat. No. 7,112,120 includes lower seal pad 58 which moves vertically within cavity 38 and is urged against rotor 26 as a result of the static pressure of the fluid flow flowing through chambers 74, 78 acting across the entire lower seal pad 58 surface area. At many operating transport fluid pressures, this can result in higher sealing pressure being exerted against rotor 26 by lower seal 58 than is needed for sealing. Such higher than necessary sealing pressure places parasitic drag on rotor 58, requiring more power (e.g., a higher horsepower motor, such as ½ horsepower) to rotate rotor 26 to overcome the parasitic drag, and causing faster wear of rotor 26 and lower seal pad 58. At low transport fluid pressures, even though acting on the entire lower seal pad 58 surface area of chambers 74, 78, the sealing pressure may be inadequate. Additionally, the sealing pressure resulting from the discussed prior art configuration may not be timed properly relative to startup of the transport fluid flow to effect sealing, even when the transport fluid operating pressure is high enough to produce adequate sealing pressure.

The present innovation allows achieving adequate sealing pressure over the desired low to high range of transport fluid operating pressure. The previously described float allows lower seal 22 to align properly with rotor 18 at low pressure, avoiding the high pressure of the prior art required to elastically conform lower seal pad 58 to align properly with rotor 26.

Referring to FIG. 4, feeder assembly 10 defines an internal transport fluid flow path from inlet 66 to outlet 68, extending through passageway 70 defined by piston 48, through passageway 72 defined by lower seal 22, through plenum 74 defined by lower seal 22 at the discharge station of pockets 44, through passageway 76 defined by lower seal 22, and through passageway 78 defined by piston 48 to outlet 68. Lower seal 22 includes chambers 62 and 64 which are in fluid communication with passageways 70 and 78 respectively. When transport fluid flows through the internal transport fluid flow path, the static pressure of the flow acts on the interior surfaces of chambers 62 and 64 and passageways 70 and 78, urging lower seal 22 away from piston 48 against rotor 18, causing it to come into alignment therewith when lower seal is urged toward rotor 18. The maximum relative movement of lower seal 22 and piston 48 away from each other is limited by the amount of float. Thus, increasing the transport fluid operating pressure once the maximum relative movement has been reached will not cause the maximum to be exceeded. Thus, the float in addition to allowing alignment also functions to limit the amount of sealing pressure resulting from the transport fluid operating pressure acting on the interior surfaces of lower seal 22. Alternatively, the float between lower seal 22 and piston 48 could be omitted, such as but not limited to if lower seal 22 and piston 48 were of unitary construction, which such configuration would not result in increased sealing pressure against rotor 18.

Figure 6:
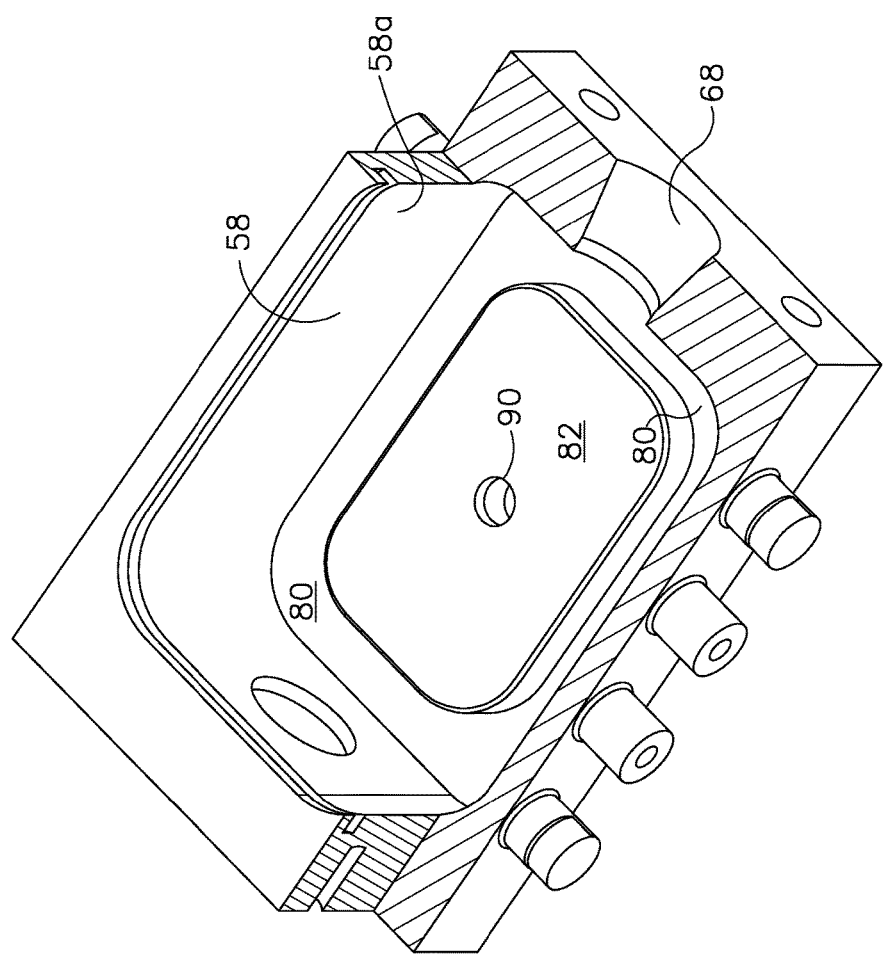
FIG. 6 is a cut-away view of the feeder block of the feeder of FIG. 2.

With the configuration of lower seal/piston assembly 46 limiting the effect of the transport fluid operating pressure on the level of sealing pressure exerted against rotor 18, the desired sealing pressure is achieved and controlled by the movement of lower seal/piston assembly 46 within cavity 58. As seen in FIGS. 4, 5 and 6, feeder block 14 comprises an annular pressure chamber 80 at its bottom, defined on the inside by centrally disposed raised portion 82 and on the outside by cavity wall 58a. Piston 48 includes downwardly depending annular extension 84 which surrounds or defines recess 84a. Seal groove 86 is formed on the inside of annular extension 84, which receives seal 88, which may be of any suitable shape and material, such as without limitation an O-ring made of Buna-N. Seal 88 seals between raised portion 82 and annular extension 84. There is clearance, such as without limitation 0.005 inches on a side, between piston 48 and cavity 58 sufficient to permit transport fluid to pressurize annular pressure chamber 80. The pressure in annular pressure chamber 80 urges lower seal/piston assembly 46 into sealing engagement with rotor 18. By sealing central raised portion 82 from annular pressure chamber 80, less than the entire normal surface area of piston 48 (or lower seal as in the prior art) is acted upon by the transport fluid pressure. By reducing the surface area, the multiplying effect of pressure based on surface area can be reduced substantially, as much as by an order of magnitude or more, making it easier to keep the sealing pressure on rotor 18 limited to a smaller range of adequate sealing pressure, thus reducing the applied load on the rotor compared to the prior art, reducing the torque required to turn rotor 18 thereby allowing the use of a smaller motor and reducing wear. The surface area of annular pressure chamber 80 may be selected to provide adequate sealing pressure against rotor 18 over the desired low to high range of transport fluid operating pressure, such selection may be based on for example, theoretical and empirical determinations.

Referring to FIG. 4, movement of lower seal/piston assembly 46 upwardly increases the volume of a cavity formed within recess 84a between piston 48 and centrally disposed raised portion 82, sealed from annular pressure chamber 80 by seal 88. To prevent resistance to the free movement of lower seal/piston assembly 46 due to a vacuum within this cavity as lower seal/piston assembly 46 move upwardly, port 90 may be formed in centrally disposed raised portion 82 aligned with opening 92 in base 12 to vent the cavity to the ambient. Port 90 and opening 92 allows any fluid transport fluid that might leak past seal 88 to escape, preventing any pressure, or moisture, buildup which may add to the sealing pressure beyond the desired range.

In an alternate embodiment, a controlled secondary fluid pressure could be applied to the cavity to supplement the sealing force, such as at start up or when the operating pressure of the transport fluid is low. Of course, such controlled secondary fluid pressure could be used as the primary or sole source of the sealing force against rotor 18, with any appropriate modifications to annular pressure chamber 80. A range of different designs of rotor 18 and/or lower seal/piston assembly 46 could be compensated for by secondary fluid pressure applied through port 90.

It will be appreciated that while pressure chamber 80 is depicted as having an annular shape disposed about central raised portion 82, it may have any suitable shape, size and location. For example, pressure chamber 80 could be centrally disposed surrounded by a raised portion.

Referring to FIG. 4, during startup, when the transport fluid is just beginning to flow, as the pressure begins to build, transport fluid can flow in gap 56 between rotor 18 and lower seal 22 until such time as the pressure is sufficient to move lower seal 22 into engagement with rotor 18 thereby closing gap 56 and preventing the fluid flow therebetween. The timing of closing gap 56 is important: The volume and therefore speed of the fluid flow in gap 56 increases over time unless gap 56 is closed. As the volume and speed increases, more pressure is required within pressure chamber 80 to close gap 56. The result is that, unless gap 56 is closed before too much fluid flow occurs therethrough, an adequate seal against rotor 18 cannot be achieved at low operating pressures. Thus, performance is improved if the system is configured such that as the system is pressurized gap 56 is closed prior to the flow therethrough becoming sufficient enough to increase the pressure required to urge lower seal 22 into sealing engagement with rotor 18 beyond the pressure available at the corresponding time. In one embodiment, controlled secondary fluid pressure may be applied at start up through port 90 thereby controlling the timing of the closing of gap 56 to occur at a suitable time. Such controlled secondary fluid pressure could be maintained throughout the time the system is on or could be removed as soon as gap 56 is closed.

During start up at a low operating pressure, for example, 40 psig, it is important attain sufficient sealing between lower seal 22 and rotor 18 before there is sufficient fluid flow between lower seal 22 and rotor 18 through gap 56 to prevent achieving adequate steady state sealing between lower seal 22 and rotor 18. The mass of lower seal/piston assembly 46 and the friction between it and cavity walls 58a does not vary at start up: The level of force required to attain sufficient sealing between lower seal 22 and rotor 18 at startup to close gap 56 before fluid flow therethrough becomes great enough to prevent closing gap 56 remains the same, yet the available pressure to act on piston 48 is less due to the low operating pressure.

Figure 7:
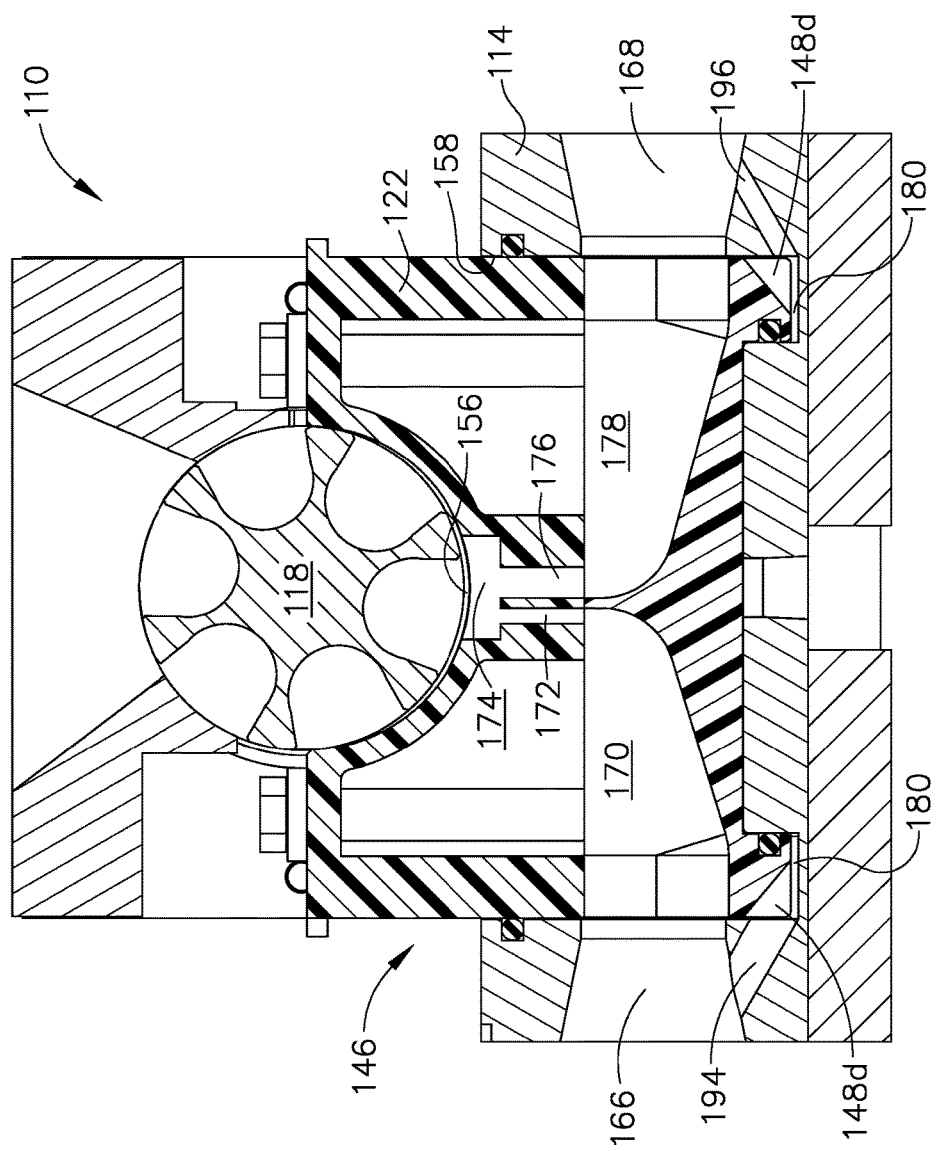
FIG. 7 is a side cross-sectional view of an alternative embodiment of the feeder of FIG. 2.

Referring to FIG. 7, an alternate embodiment is illustrated which provides improved response time in reaching a pressure in the annular pressure chamber sufficient to provide desired sealing between rotor 118 and seal 122 at the desired time during initial start up and which provides adequate sealing between rotor 118 and seal 122 during steady state operation without producing excessive and therefore deleterious force by seal 122 on rotor 118, over a wide range of transport fluid operating pressure, including low pressures as low as 20 PSIG. Feeder assembly 110 is the same as feeder assembly 10, except that feeder block 114 is configured with inlet passageway 194 through which annular pressure chamber 180 is placed in direct fluid communication with inlet 166, and outlet passageway 196 through which annular pressure cavity 180 is placed in direct fluid communication with outlet 168. At inlet 166, the primary flow of the transport fluid flows through internal passageway 170, internal passageway 172, through plenum 174, through passageway 176, through passageway 178 to outlet 168. There is a secondary flow through inlet passageway 194, through annular pressure chamber 180 to outlet passageway 196 where it rejoins the primary flow. Piston 148 includes passages 148d, which may be of any suitable configuration such as the depicted slots, at either end aligned with inlet passageway 194 and outlet passageway 196. Inlet passageway 194 and outlet passageway 196 are sized, angled and located to provide sufficient pressure within annular pressure chamber 180 to produce adequate sealing force between lower seal 122 and rotor 118 over the desired low to high range of transport fluid operating pressure and to have the desired response time to always create sufficient sealing force between lower seal 122 and rotor 118 to close gap 156 before flow of transport fluid therethrough becomes great enough to prevent closing gap 156. By way of non limiting example only, inlet passageway 194 may be 0.25 inches in diameter and formed at a 30° angle to the axis of inlet 166, and outlet passageway 196 may be 0.125 inches in diameter and formed at a 30° angle to the axis of outlet 168.

Figure 8:
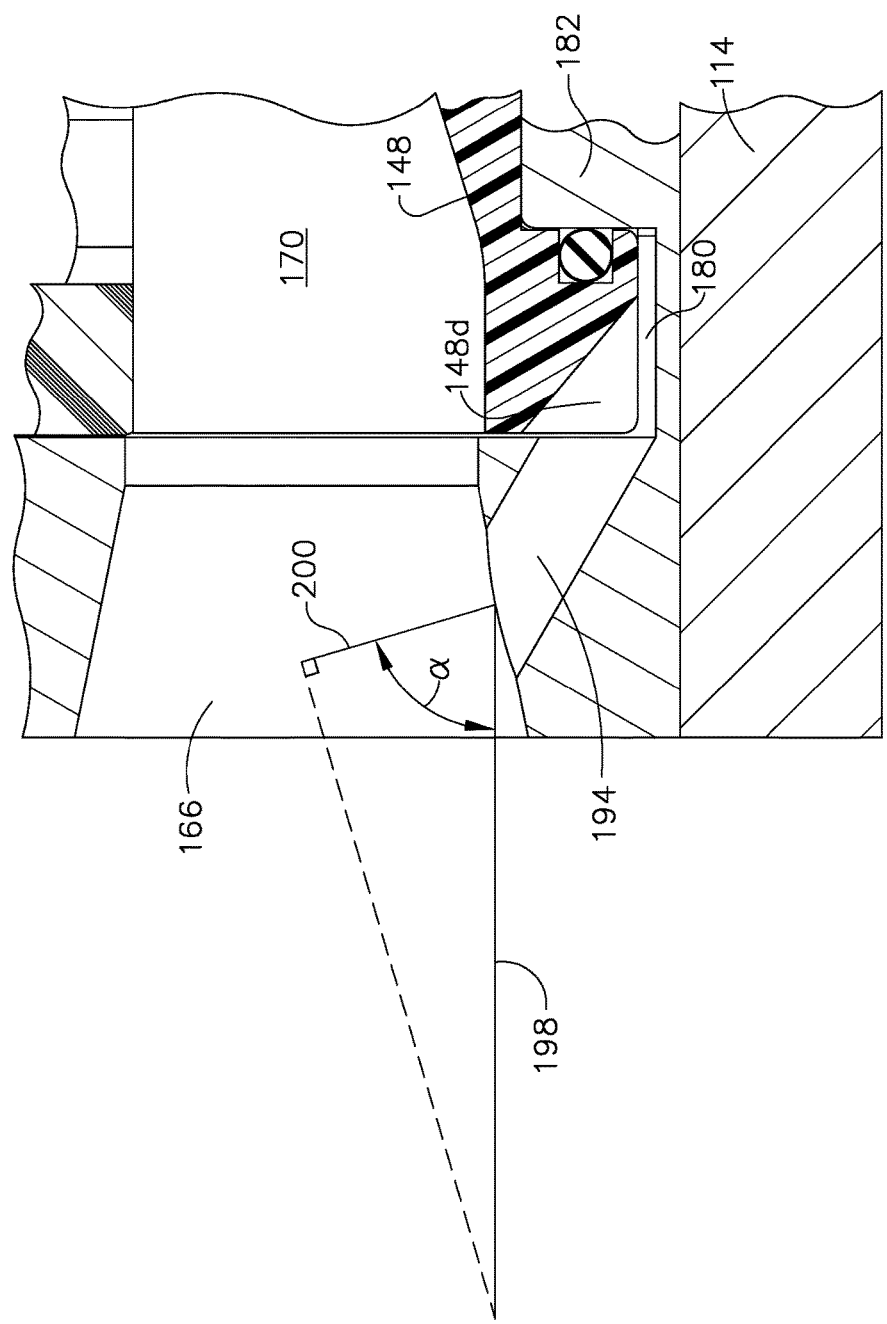
FIG. 8 is an enlarged fragmentary view of the inlet area of the feeder block of FIG. 7.

Inlet passageway 194 utilizes the relationship of total pressure as the sum of dynamic pressure and static pressure, to provide desired pressure within annular pressure chamber 180. Referring to FIG. 8, since dynamic pressure is a measure of the kinetic energy per unit volume of the moving transport fluid, which is a function of the fluid's density and velocity, the total pressure entering inlet can be expressed as vector 198 indicating the total pressure's corresponding inlet velocity magnitude and direction. Dynamic velocity can also be expressed by vector 200.

The orientation, including the angle, and size of inlet passageway 194 are selected relative to the transport fluid's total pressure at inlet passageway 194, with the levels of static pressure and dynamic pressure at inlet passageway 194 resulting at least in part from passageway alignment angle α. Angle α and size of inlet passageway 194 are selected such that a sufficient amount of dynamic pressure is available at startup in the secondary flow through inlet passageway 194 into annular pressure chamber 180 to provide the desired sealing in a sufficiently quick response time by pressurizing annular pressure chamber 180. Outlet passageway 196 and annular pressure chamber 180 are sized such that the resulting force exerted on piston 148 at the lowest of the operating pressure range produces adequate sealing pressure between lower seal 122 and rotor 118. Inlet passageway 194, annular pressure chamber 180 and outlet passageway 196 are also configured to provide a sufficiently quick response time of force sufficient for lower seal 122 to seal against rotor 118 quickly enough to prevent transport fluid flow between lower seal 122 and rotor 118 at gap 156 during start up from preventing achieving adequate steady state sealing between lower seal 122 and rotor 118 at the steady state low operating pressure. The effective flow area experienced by the secondary flow increases as the secondary flow travels from inlet passageway 194 into annular pressure chamber 180. The resulting drop in velocity of the secondary flow reduces the dynamic pressure producing a correlating increase in static pressure. The surface area of piston 148 which forms a boundary of annular pressure chamber 180 is sized to provide the desired response time and steady state sealing force produced by the static pressure in annular pressure chamber 180 acting thereon. The secondary flow path for the secondary flow, which in the embodiment depicted comprises inlet passageway 194, annular pressure chamber 180 and outlet passageway 196, may be of any suitable configuration and structure. For example, annular pressure chamber 180 may have any shape and volume which functions to produce the desired sealing and timing of effecting the seal between rotor 118 and seal 122. Inlet passageway 194 may be configured to be in fluid communication with the transport fluid upstream of inlet 166, such as for example being configured as a tap or port formed in communication with an upstream transport fluid passageway disposed at an orientation sufficient to provide a sufficient level of total pressure in the secondary flow sufficient to achieve the desired functionality of sealing and timing of sealing. Outlet passageway 196 functions to provide suitable and desired reduction in velocity of the secondary flow within annular pressure chamber 180 to decrease dynamic pressure so as to adequately increase static pressure by presenting a desired resistance to the secondary flow at outlet passageway 196. An alternative embodiment of outlet passageway 196 comprises a flow control valve which may be operated in any suitable manner (such as manually or controlled electronically) to produce the desired static pressure within annular pressure chamber 180. The amount of restriction provided by such a flow control valve may, for example, be varied in dependence on the transport fluid operating pressure. The size of the surface area of piston 148 on which the static pressure within annular pressure chamber 180 act is based at least in part on the static pressure within annular pressure chamber 180. As is clear from the illustrations, in the embodiment depicted, the size of centrally disposed raised portion 182 is complementary to the size of the surface area of piston 148 on which the static pressure within annular pressure chamber 180 is based.

During steady state operation, there is continuous secondary flow through inlet passageway 194, annular pressure chamber 180 and outlet passageway 196, which may be sized to reduce the possibility of foreign object buildup or contamination of the path of the secondary flow. For example, water or secondary contaminant particles such as sand or dirt which enter through inlet passageway 194 would be carried by the secondary flow through chamber 180 and out outlet passageway 196 without blockage.

The foregoing description of an embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. Although only a limited number of embodiments is explained in detail, it is to be understood that the invention is not limited in its scope to the details of construction and arrangement of components set forth in the preceding description or illustrated in the drawings. The innovation is capable of other embodiments and of being practiced or carried out in various ways. Also specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. A feeder assembly configured to transport blast media from a source of media into a flow of transport gas, the feeder comprising:
   a. a rotor comprising a peripheral surface, the rotor being rotatable about an axis of rotation;
   b. a cavity defined by at least one cavity wall and a cavity bottom, the cavity comprising a cavity axis;
   c. a seal comprising a first surface, the first surface disposed adjacent at least a portion of the peripheral surface;
   d. a piston moveably disposed at least partially in the cavity, the piston being moveable along the cavity axis, the piston having a bottom;
   e. an inlet connectable to a transport fluid source;
   f. an outlet;
   g. a transport fluid flow path, at least a portion of the transport fluid flow path being defined by the seal and the piston, the transport fluid flow path comprising an entrance and an exit, the entrance being in fluid communication with the inlet, the exit being in fluid communication with the outlet; and
   h. a pressure chamber defined by the piston and at least a respective portion of the at least one cavity wall and the cavity bottom, wherein the piston and the seal are configured such that pressure within the pressure chamber controls how much sealing force with which the first surface is urged against the peripheral surface.

2. The feeder assembly of claim 1, wherein the seal and the piston are of unitary construction.

3. The feeder assembly of claim 1, wherein the seal is moveable relative to the piston.

4. The feeder assembly of claim 3, wherein when the pressure in the pressure chamber exceeds a first pressure, the piston contacts the seal.

5. The feeder assembly of claim 3, comprising a retaining system, the retaining system securing the seal to the piston while allowing relative movement therebetween.

6. The feeder assembly of claim 1, comprising a housing, the housing comprising the at least one cavity wall and the cavity bottom.

7. The feeder assembly of claim 1, wherein the pressure chamber is annular and the piston comprises an annular extension shaped complementarily to the annular pressure chamber.

8. The feeder assembly of claim 1, wherein pressure of transport fluid flowing through the transport fluid flow path is the source of pressure for the pressure chamber.

9. The feeder assembly of claim 1, comprising an inlet passageway, the inlet passageway comprising a first end and a second end, the first end disposed in fluid communication with the transport fluid flow path, the second end disposed in fluid communication with the pressure chamber, whereby transport fluid flowing in the transport fluid flow path is the source of the pressure within the pressure chamber.

10. The feeder assembly of claim 9, comprising an outlet passageway in fluid communication with the pressure chamber.

11. The feeder assembly of claim 10, wherein the inlet passageway, the pressure chamber and the outlet passageway are configured to provide a sufficiently quick response time of force during startup of transport fluid flow through the transport fluid flow path sufficient for the first surface to seal against the peripheral surface quickly enough to prevent transport fluid flow between the first surface and the peripheral surface from preventing achieving adequate steady state sealing between the first surface and the peripheral surface during low steady state operating pressure of the transport fluid flow.

12. The feeder assembly of claim 9, wherein the inlet passageway is sized and oriented relative to the transport fluid flow path such that during startup of transport fluid flow through the transport fluid flow path the pressure chamber is pressurized as a result of transport fluid flowing through the transport fluid flow path with sufficient pressure to urge the first surface against the peripheral surface sufficiently quick enough to overcome the pressure of any transport fluid flowing between the first surface and the peripheral surface so as to form a seal between the first surface and the peripheral surface.

13. The feeder assembly of claim 9, wherein the inlet passageway is sized and oriented relative to the transport fluid flow path such that during startup of transport fluid flow through the transport fluid flow path a sufficient amount of dynamic pressure of the transport fluid flowing through the transport fluid flow path is available in the inlet passageway downstream of the first end to pressurize the pressure chamber with sufficient pressure to urge the first surface against the peripheral surface sufficiently quick enough to overcome any transport fluid flowing between the first surface and the peripheral surface so as to form a seal between the first surface and the peripheral surface.

14. The feeder assembly of claim 9, wherein the first end is in fluid communication with the inlet.

15. A feeder assembly configured to transport blast media from a source of media into a flow of transport gas, the feeder comprising:
   a. a rotor comprising a peripheral surface, the rotor being rotatable about an axis of rotation;
   b. a cavity defined by at least one cavity wall and a cavity bottom, the cavity comprising a cavity axis;
   c. a seal moveably disposed at least partially in the cavity, the seal being moveable along the cavity axis, the seal comprising a first surface, the first surface disposed adjacent at least a portion of the peripheral surface;
   d. a transport fluid flow path, at least a portion of the transport fluid flow path being defined by the seal;
   e. clearance between the seal and the at least one cavity wall, the clearance being configured to allow the seal to align with the portion of the peripheral surface in response to pressure within the transport fluid flow path when said seal is urged into sealing engagement with the peripheral surface.

16. The feeder assembly of claim 15, comprising a piston moveably disposed at least partially in the cavity, the piston being moveable along the cavity axis, a portion of the transport fluid flow path being defined by the piston, wherein when the piston is urged toward the rotor the seal is concomitantly urged toward the rotor.

17. The feeder assembly of claim 16, wherein the seal is moveable relative to the piston.

18. The feeder assembly of claim 17, comprising a retaining system, the retaining system securing the seal to the piston while allowing relative movement therebetween.

* * * * *